US011103076B2

(12) United States Patent
Oh

(10) Patent No.: US 11,103,076 B2
(45) Date of Patent: Aug. 31, 2021

(54) CONNECTING STRUCTURE OF BED FRAME

(71) Applicant: GRANTEC (XIAMEN) CO., LTD., Fujian (CN)

(72) Inventor: Suk Kan Oh, Fujian (CN)

(73) Assignee: Grantec (Xiamen) Co., Ltd, Xiamen (CN)

( * ) Notice: Subject to any disclaimer, the term of this patent is extended or adjusted under 35 U.S.C. 154(b) by 214 days.

(21) Appl. No.: 15/954,565

(22) Filed: Apr. 16, 2018

(65) Prior Publication Data

US 2019/0313806 A1 Oct. 17, 2019

(51) Int. Cl.
*A47C 19/02* (2006.01)

(52) U.S. Cl.
CPC .......... *A47C 19/024* (2013.01); *A47C 19/025* (2013.01)

(58) Field of Classification Search
CPC ... A47C 19/021; A47C 19/025; A47C 19/024; A47C 19/005; A47C 19/00; A47C 19/02; F16B 12/54; F16B 12/50; F16B 2012/505
See application file for complete search history.

(56) References Cited

U.S. PATENT DOCUMENTS

| 608,545 | A | * | 8/1898 | Coburn | A47C 19/022 |
| | | | | | 5/279.1 |
| 854,561 | A | * | 5/1907 | Brooks | F16B 12/54 |
| | | | | | 5/283 |
| 4,145,777 | A | * | 3/1979 | Potter | A47C 19/005 |
| | | | | | 29/446 |
| 4,559,657 | A | * | 12/1985 | Whitehead | A47C 19/021 |
| | | | | | 403/10 |
| 4,613,999 | A | * | 9/1986 | Franco | A47C 27/085 |
| | | | | | 312/140 |
| 4,745,644 | A | * | 5/1988 | Pottschmidt | A47C 19/005 |
| | | | | | 5/200.1 |
| 5,522,101 | A | * | 6/1996 | Yeh | A47C 19/005 |
| | | | | | 403/334 |
| 5,613,253 | A | * | 3/1997 | Rose | A47C 19/005 |
| | | | | | 5/309 |
| 5,625,987 | A | * | 5/1997 | Zamerovsky | E04B 1/003 |
| | | | | | 52/263 |
| 7,690,058 | B1 | * | 4/2010 | Dwyer | A47C 19/005 |
| | | | | | 5/310 |
| 2005/0039258 | A1 | * | 2/2005 | Gavela Vazquez | A47C 23/061 |
| | | | | | 5/400 |

(Continued)

FOREIGN PATENT DOCUMENTS

EP 1532899 A1 * 5/2005 ........... A47C 19/021
KR 20120078430 A * 7/2012 ........... A47C 19/021

*Primary Examiner* — Robert G Santos
*Assistant Examiner* — Alison N Labarge

(57) ABSTRACT

A connecting structure of a bed frame is disclosed. The bed frame includes a frame and bed legs connected under the frame. The frame includes two lateral rods and two longitudinal rods connected to the lateral rods. Respective two sides of the lateral rods or the longitudinal rods are provided with mounting troughs for insertion of respective two end portions of the longitudinal rods or the lateral rods. An outer side surface of each of the mounting troughs is provided with at least one mounting hole. The lateral rods and the longitudinal rods are perpendicularly connected to each other through the mounting troughs. The structure of the bed frame is simple, and the installation is convenient.

13 Claims, 4 Drawing Sheets

(56) References Cited

U.S. PATENT DOCUMENTS

2011/0219537 A1\* 9/2011 Lin ............... A47C 19/021
 5/9.1
2017/0055715 A1\* 3/2017 Rohr ............. A47C 19/021

\* cited by examiner

CONNECTING STRUCTURE OF BED FRAME

BACKGROUND OF THE INVENTION

1. Field of the Invention

The present invention relates to a bed frame, and more particularly to a connecting structure of a bed frame.

2. Description of the Prior Art

In general, the bed frame comprises a frame body and bed legs. The frame body generally comprises two longitudinal side rods and two lateral side rods to form a rectangular frame. The middle portion of the frame is provided with rod members arranged in a row or a T-shaped frame to form a support for a bed board or mattress.

For the connection of the rod members and the frame body of the bed frame, it is required to provide screw holes at the junction of each pole (or leg) and the side rod/side frame of the bed frame in conjunction with a sufficient number of screws for connection. For example, the frame body includes two lateral rods and two longitudinal rods. The bottom of the frame body is connected with the bed legs. The two lateral rods are connected with the longitudinal rods and are assembled in order. Such a connection mechanism has the following disadvantages:

(1) During the connection and assembly, the work of screwing is relatively complicated. If the assembly is accidentally misassembled, the screws must be unscrewed and then screwed again. The assembly process is time-consuming and inconvenient.

(2) The structure is scattered, and the parts are easy to lose. The disassembly workload is heavy, and the strength of the components of the bed frame will be affected to a certain extent. Many actions need to be taken for folding and unfolding. The assembly is time-consuming and laborious.

(3) It is necessary to connect the frame body with the bed legs, thus requiring additional installation steps. The bed legs are set at the corners of the bed frame. At the corner of the bed frame, the side rods of the bed frame need to be connected and assembled, and then the bed legs are connected. The structure of the bed frame is more complex, and the connection is more complicated, increasing the difficulty of installation and affecting the overall appearance of the bed frame.

Accordingly, the inventor of the present invention has devoted himself based on his many years of practical experiences to solve these problems.

SUMMARY OF THE INVENTION

The primary object of the present invention is to provide a connecting structure of a bed frame. The structure of the bed frame is simple to achieve a convenient installation and improve installation efficiency.

In order to achieve the aforesaid object, the bed frame of the present invention comprises a frame and bed legs connected under the frame. The frame comprises two lateral rods and two longitudinal rods connected to the lateral rods. Respective two sides of the lateral rods or the longitudinal rods are provided with mounting troughs for insertion of respective two end portions of the longitudinal rods or the lateral rods. An outer side surface of each of the mounting troughs is provided with at least one mounting hole. The lateral rods and the longitudinal rods are perpendicularly connected to each other through the mounting troughs.

Preferably, the respective two end portions of the lateral rods or the longitudinal rods are provided with mounting screw holes corresponding to the mounting holes of the mounting troughs.

Preferably, the respective two end portions of the lateral rods or the longitudinal rods are inserted into the mounting troughs, the mounting screw holes are aligned with the mounting holes, and screws are inserted through the mounting holes and the mounting screw holes in an outside-in manner.

Preferably, the bed legs are connected under the respective two sides of the lateral rods or the longitudinal rods.

Preferably, respective two side ends of the lateral rods or the longitudinal rods extend downwards to form the bed legs. The lateral rods or the longitudinal rods constitute a support frame in the form of a door frame. The mounting troughs are located at respective two ends of the lateral rods or the longitudinal rods and located above the bed legs.

With the above structure, when the bed frame according to the present invention is installed, the lateral rods and the longitudinal rods that form the bed frame are connected by directly inserting in the mounting troughs. In conjunction with the bed legs, the structure of the bed frame is simple, and the operation is quick and easy to achieve a convenient installation and improve installation efficiency.

DETAILED DESCRIPTION OF THE PREFERRED EMBODIMENTS

Embodiments of the present invention will now be described, by way of example only, with reference to the accompanying drawings.

Figure 1:
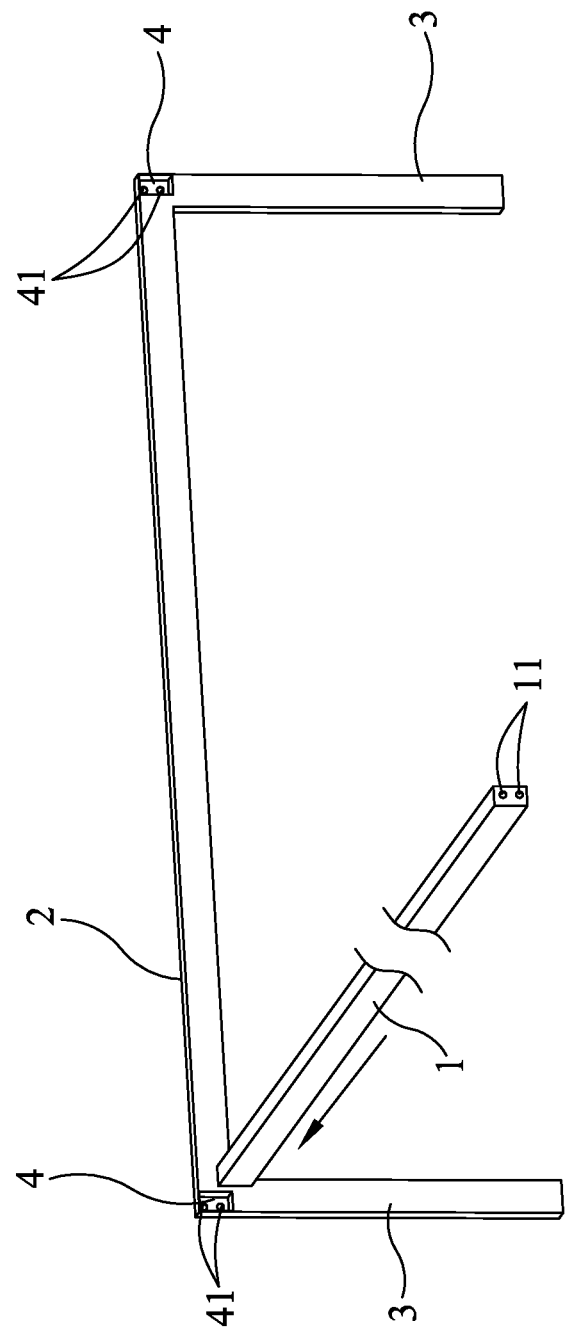
FIG. 1 is a schematic view showing the assembly of the present invention.
Figure 2:
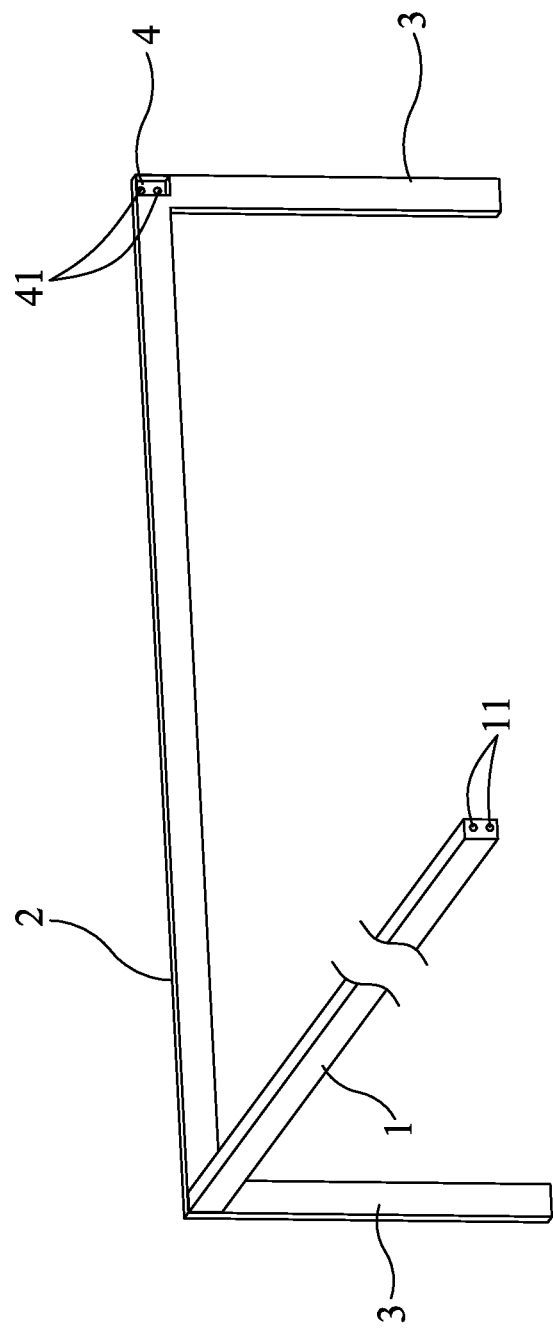
FIG. 2 is a schematic view of the present invention after a longitudinal rod has been connected to a lateral rod.
Figure 3:
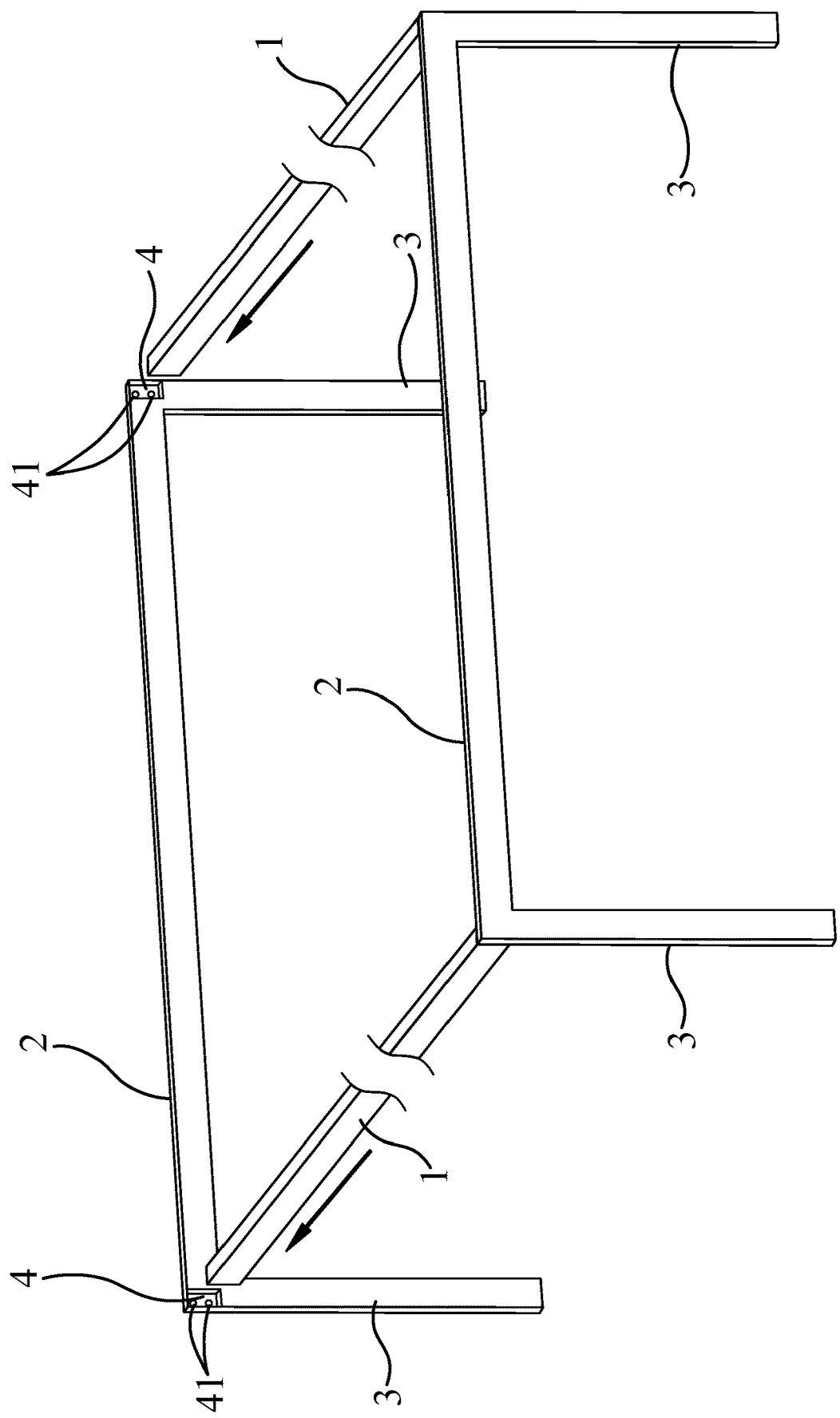
FIG. 3 is a schematic view of two lateral rods in the process of being connected to two longitudinal rods.
Figure 4:
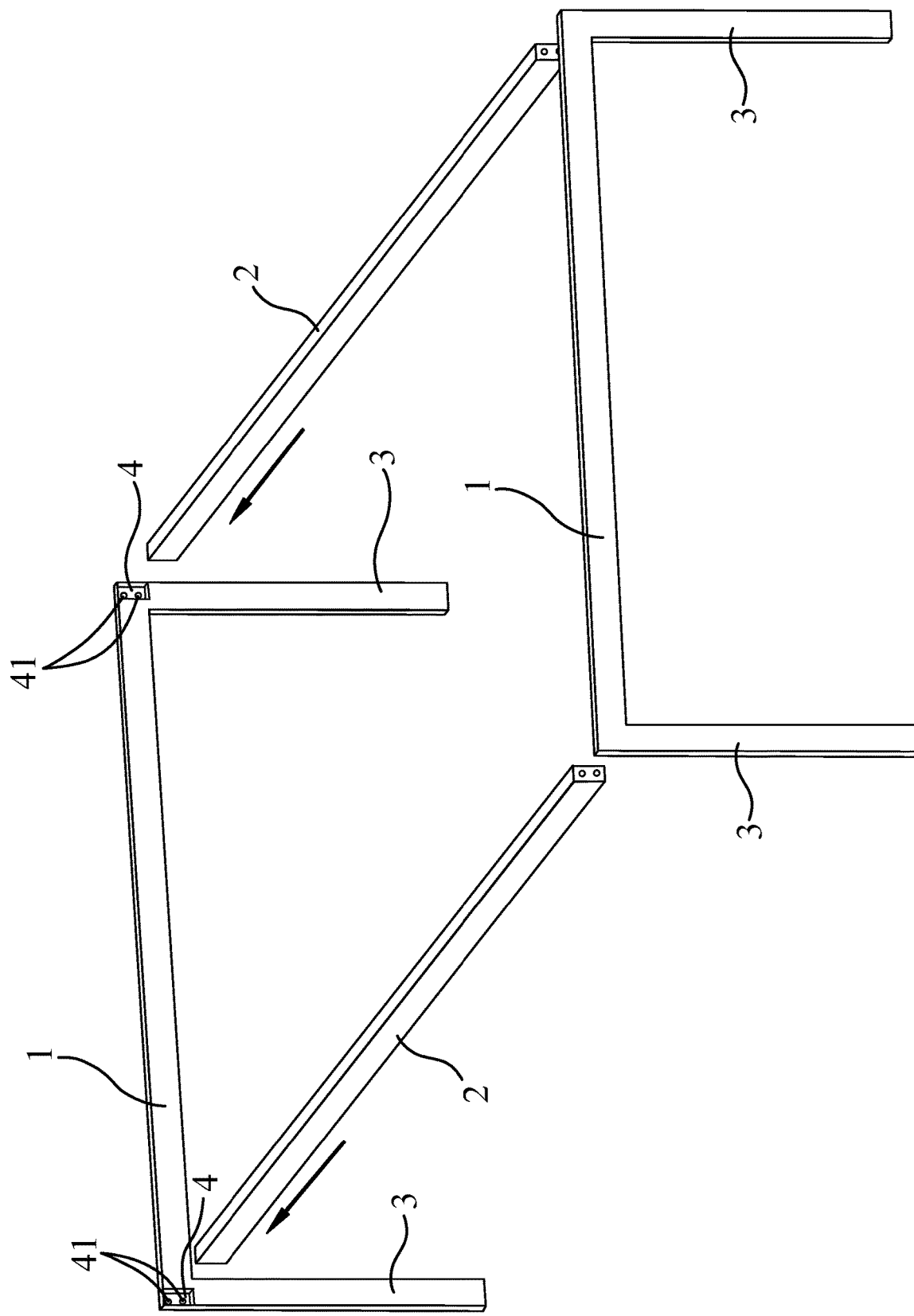
FIG. 4 is a schematic view of two longitudinal rods in the process of being connected to two lateral rods.

As shown in FIG. 1 and FIG. 2, the present invention discloses a connecting structure of a bed frame. The bed frame comprises a frame and bed legs connected under the frame. In the embodiment, a complete frame is not shown, and only the rods at one side of the frame are shown. The frame comprises two lateral rods 1 and two longitudinal rods 2 connected to the lateral rods 1. The bed legs 3 are connected under the respective two sides of the lateral rods 1 or the longitudinal rods 2.

In the present invention, in order to make the connection of the bed frame easier, in the bed frame, the respective two sides of the lateral rods or the longitudinal rods are provided with mounting troughs 4 for insertion of the end portions of the longitudinal rods or the lateral rods. An outer side surface of each mounting trough 4 is provided with at least one mounting hole 41. The lateral rods and the longitudinal rods are perpendicularly connected to each other through the mounting troughs. Furthermore, the respective two side ends of the lateral rods or the longitudinal rods extend downwards to form the bed legs 3. The lateral rods or the longitudinal rods constitute a support frame in the form of a door frame.

In this embodiment, the mounting troughs 4 are disposed at the respective two ends of the longitudinal rods 2 as an example. The end portions of the lateral rod 1 are inserted into the mounting troughs 4 at the two ends of the longitudinal rod 1. The two side ends of the longitudinal rod extend downwardly to form the bed legs 3, thereby forming the support frame in the form of a door frame. The mounting troughs 4 are located at the two ends of the longitudinal rod 2 and located above the bed legs 3, thereby saving the independent installation of the bed legs 3. The support of the bed legs also increases the support force at the mounting troughs 4. A pair of parallel rods, such as two longitudinal rods 2, forms a support frame in the form of a door frame. The bed legs are connected under the two ends of the longitudinal rod 2. The mounting troughs 4 are disposed at the two ends of the longitudinal rod 2 so that the two ends of the lateral rod 1 are directly inserted into the mounting troughs 4 to form a bed frame. The bed frame can be installed easily and quickly.

Furthermore, mounting screw holes corresponding to the mounting holes are defined in the respective two end portions of the lateral rods or the longitudinal rods, so that the lateral rods or the longitudinal rods inserted in the mounting troughs 4 can be connected and positioned. In this embodiment, the two ends of the lateral rod are provided with the mounting screw holes 11. For installation, after the two end portions of the lateral rod are inserted into the mounting troughs 4, the mounting screw holes 11 are aligned with the mounting holes 41, and screws (not shown) are inserted through the mounting holes 41 and the mounting screw holes 11 in an outside-in manner so as to fix the end portions of the lateral rod 1. The lateral rod 1 is connected between the two longitudinal rods 2.

With the above structure, when the bed frame according to the present invention is installed, the lateral rods and the longitudinal rods that form the bed frame are connected by directly inserting in the mounting troughs. In conjunction with the bed legs, the structure of the bed frame is simple, and the operation is quick and easy to achieve a convenient installation and improve installation efficiency.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A connecting structure of a bed frame, the bed frame comprising a frame and bed legs connected under the frame, the frame comprising two lateral rods and two longitudinal rods connected to the lateral rods, respective two sides of the lateral rods or the longitudinal rods being provided with mounting troughs that are indentations in planar inner side surfaces of the lateral rods or the longitudinal rods, respective two end portions of the lateral rods or the longitudinal rods being adapted for axial insertion into the mounting troughs in a direction orthogonal to each planar inner side surface, each mounting trough being adapted to surround all sides of each end portion that is inserted into the mounting trough, an outer side surface of each of the mounting troughs being provided with at least one mounting hole, the outer side surface and the planar inner side surface of each lateral rod or longitudinal rod being parallel to one another, and the lateral rods and the longitudinal rods being perpendicularly connected to each other through the mounting troughs.

2. The connecting structure of the bed frame as claimed in claim 1, wherein the respective two end portions of the lateral rods or the longitudinal rods are provided with mounting screw holes corresponding to the mounting holes of the mounting troughs, wherein the mounting screw holes are oriented axially to the lateral rods or the longitudinal rods, and wherein the mounting screw holes and the mounting holes are aligned with one another perpendicularly to the planar inner side surfaces.

3. The connecting structure of the bed frame as claimed in claim 2, wherein the respective two end portions of the lateral rods or the longitudinal rods are inserted into the mounting troughs, wherein screws are inserted through the mounting holes and the mounting screw holes in an outside-in manner, and wherein the screws are inserted parallel to the direction in which the lateral rods or the longitudinal rods are inserted into the mounting troughs.

4. The connecting structure of the bed frame as claimed in claim 1, wherein the bed legs are connected under the respective two sides of the lateral rods or the longitudinal rods.

5. The connecting structure of the bed frame as claimed in claim 1, wherein respective two side ends of the lateral rods or the longitudinal rods extend downwards to form the bed legs, the lateral rods or the longitudinal rods together with the bed legs forming an integral, unitary support frame in the form of a door frame, and the mounting troughs are located at respective two ends of the lateral rods or the longitudinal rods and located above the bed legs.

6. A bed frame, comprising:
   at least two lateral bars, wherein each lateral bar has an outer side surface and a planar inner side surface, and wherein the outer side surface and the planar inner side surface are parallel to one another; and
   at least two longitudinal bars connected to the lateral bars, wherein mounting troughs are disposed opposite each other on each lateral bar, wherein the mounting troughs of each lateral bar are indentations in the planar inner side surface, wherein an end of each longitudinal bar is adapted to fit axially into a mounting trough, wherein the mounting troughs are adapted to surround all sides of each end of each longitudinal bar, wherein a mounting hole is disposed in the outer side surface of each lateral bar opposite each mounting trough in the planar inner side surface, and wherein the lateral bars are perpendicularly connected to the longitudinal bars when the ends of the longitudinal bars are axially inserted into the mounting troughs in a direction orthogonal to the planar inner side surface.

7. The bed frame of claim 6, wherein a mounting screw hole is disposed in each end of each longitudinal bar, wherein the mounting screw hole is oriented axially to each longitudinal bar, and wherein the mounting hole in the outer side surface of each lateral bar opposite each mounting trough is aligned with the mounting screw hole in each end of each longitudinal bar when each end of each longitudinal bar is inserted into each mounting trough.

8. The bed frame of claim 7, wherein screws are inserted through the mounting holes and the mounting screw holes in a direction parallel to the direction in which the longitudinal bars are inserted into the mounting troughs.

9. The bed frame of claim 6, wherein ends of the lateral bars extend downwards to form bed legs, wherein each lateral bar together with its bed legs form an integral, unitary support frame, and wherein the mounting troughs are disposed above the bed legs.

10. A bed frame, comprising:
    at least two longitudinal bars, wherein each longitudinal bar has an outer side surface and a planar inner side surface, and wherein the outer side surface and the planar inner side surface are parallel to one another; and at least two lateral bars connected to the longitudinal bars, wherein mounting troughs are disposed opposite each other on each longitudinal bar, wherein each end of each lateral bar is adapted to fit axially into a mounting trough, wherein each mounting trough is an indentation in the planar inner side surface adapted to surround all sides of each end of each lateral bar, wherein a mounting hole is disposed in the outer side surface of each longitudinal bar opposite each mounting trough in the planar inner side surface, and wherein the longitudinal bars are perpendicularly connected to the lateral bars when the ends of the lateral bars are axially inserted into the mounting troughs in a direction orthogonal to the planar inner side surface.

11. The bed frame of claim 10, wherein a mounting screw hole is disposed in each end of each lateral bar, wherein the mounting screw hole is oriented axially to each lateral bar, and wherein the mounting hole in the outer side surface of each longitudinal bar opposite each mounting trough is aligned with the mounting screw hole in each end of each lateral bar when each end of each lateral bar is inserted into each mounting trough.

12. The bed frame of claim 11, wherein screws are inserted through the mounting holes and the mounting screw holes in a direction parallel to the direction in which the lateral bars are inserted into the mounting troughs.

13. The bed frame of claim 12, wherein ends of the longitudinal bars extend downwards to form bed legs, wherein each longitudinal bar together with its bed legs form an integral, unitary support frame, and wherein the mounting troughs are disposed above the bed legs.

* * * * *